Aug. 8, 1967     D. W. DE WERTH     3,334,620
RADIANT OVEN
Filed May 4, 1965
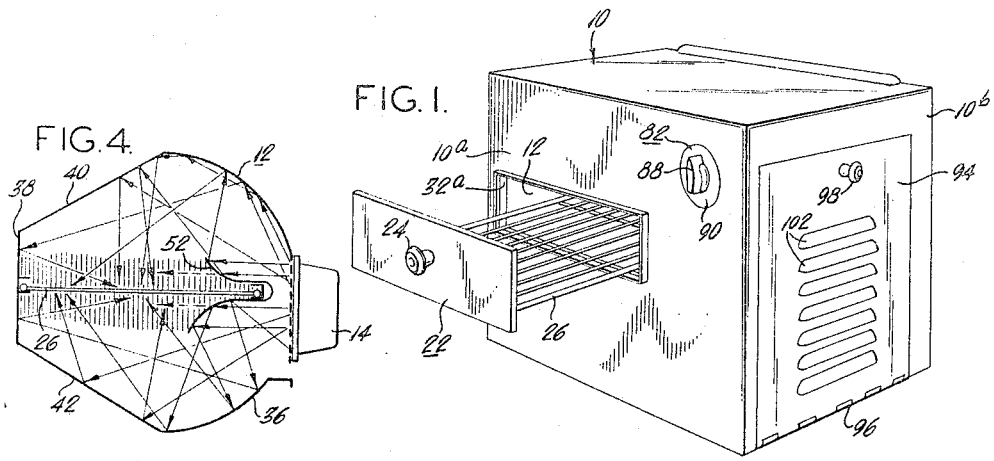
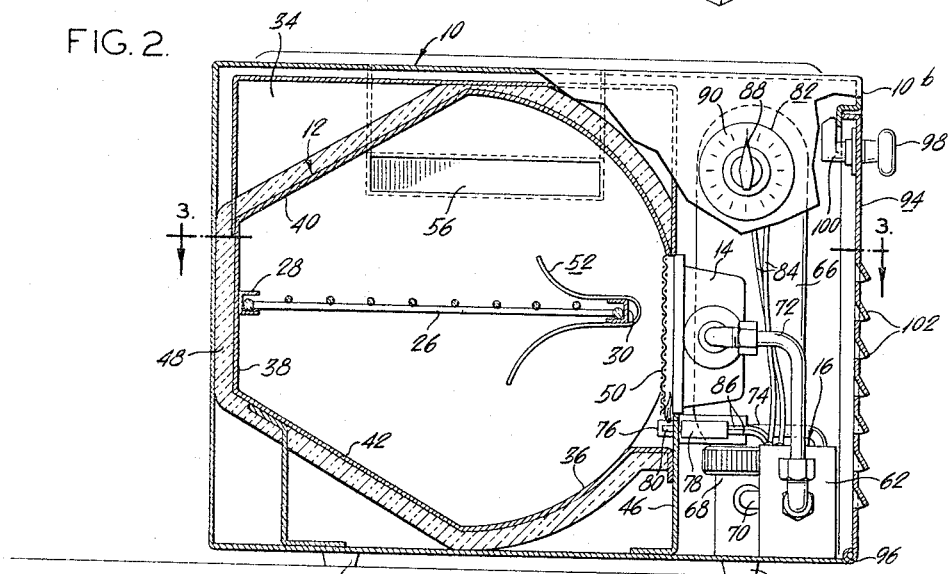
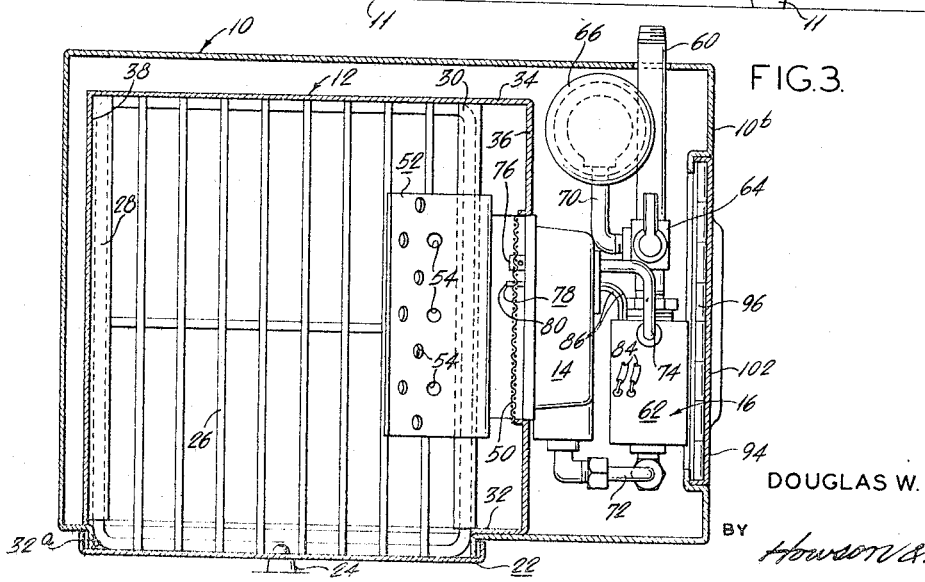
INVENTOR:
DOUGLAS W. DeWERTH
BY Howson & Howson
ATTYS.

United States Patent Office 3,334,620
Patented Aug. 8, 1967

3,334,620
RADIANT OVEN
Douglas W. De Werth, Cleveland, Ohio, assignor to American Gas Association, Inc., New York, N.Y., a corporation of New York
Filed May 4, 1965, Ser. No. 453,041
12 Claims. (Cl. 126—41)

ABSTRACT OF THE DISCLOSURE

A method of equalizing heat fluxes on a food rack generally located at mid-oven level in an oven chamber and an apparatus for carrying out the method. The oven employs a burner producing reflectable infra-red radiation and hot flue gases and has an inner surface capable of reflecting radiation and of a shape to provide heat reflection toward the food rack. The burner is located in a sidewall of the oven chamber and in adjusted in the sidewall to a level with respect to the level of the food rack so that the sum of the reflected and radiated heat fluxes from the inner surfaces of the oven chamber to the upper and lower surfaces of the food rack is substantially equalized. Vent means in the oven chamber is provided at such a distance from the burner so that hot flue gases will heat walls of the oven before they escape, and a radiation diffusion baffle between the burner and food rack is employed to shield the food rack from substantial direct radiation.

The present invention relates to a radiant oven and, more particularly, to an improved gas-fired infra-red radian oven for evenly and rapidly heating foods.

There are many applications in which it is desirable to provide a counter-top warming and toasting oven which is capable of heating refrigerated, precooked or cellophane-wrapped foods to serving temperature. It is also desirable to provide such an oven which is capable of heating foods, such as hot dogs, hamburgers and grilled cheese sandwiches, to serving temperature. It is also desirable to provide such an oven which is small, light in weight, efficient in operation, and completely portable for use in outside locations.

In the prior art, many warming and toasting ovens have been designed employing either electrical or gas operated heat sources. The gas-operated ovens have many advantages over the electric operated ovens. Gas-operated ovens require no outside electrical connection thereto, and portability of a gas-operated oven may be achieved by using a bottled gas fuel supply. In addition, gas-fired radiant burners provide a higher percentage of their radiant energy in the penetrating infra-red region than do electric infra-red heat sources.

In gas-fired prior art ovens, systems have been designed attempting to obtain even heating of food placed therein. These gas-fired ovens have usually employed two gas-fired radiant burners, located on opposite sides of an oven chamber, in an attempt to provide even distribution of radiation across a food rack located therebetween. These systems have not provided, however, a gas-fired oven which would efficiently use the hot flue gases produced by the gas-fired burner and an oven capable of providing an equalization of heat flux over the top and bottom of food being heated in the oven when only one gas-fired radiant burner is employed. In addition, these prior art gas ovens have not been as compact and inexpensive as desirable, nor have they been capable of easy portable operation.

In accordance with the present invention in its broader aspect of equalizing heat fluxes in an oven chamber, the equalizing of the heat fluxes is accomplished through the arrangement of a horizontally oriented food rack generally located at mid-oven level in the oven chamber and a gas-fired radiant burner located in a sidewall of the oven chamber. The gas-fired radiant burner heats the oven and food rack by producing reflectable infra-red radiation and hot flue gases. The inner surface of the oven chamber is preferably capable of reflecting radiation. The heat input of the gas-fired radiant burner is regulated to a predetermined value, and the hot flue gases from the radiant burner are vented from the oven chamber at a distance from the radiant burner so that heating of walls of the oven chamber is produced by the hot flue gases before escaping from the chamber. The level of the radiant burner in the sidewall is adjusted relative thereto to the level of the food rack in the chamber so that the sum of the reflected and radiated heat fluxes from the inner surfaces of the chamber to the lower side of the food rack is substantially equal to the sum of the reflected and radiated heat fluxes from the inner surfaces to the upper side of the food rack. Further, in accordance with the invention, shielding of the food rack from substantial direct radiation from the radiant burner is employed for preventing the food rack adjacent the burner from receiving more radiation than the portion more distant from the radiant burner.

In accordance with the present invention, the apparatus in one form may be provided by an oven chamber of generally pear-shaped form in cross-section with flat front and back walls, the inner surfaces of the oven chamber being capable of reflecting radiation. A horizontally oriented food rack is supported in the oven chamber at substantially mid-oven level and a gas-fired radiant burner is located in the curved sidewall of the oven chamber and is adjusted to a predetermined heat input. The gas-fired radiant burner heats the oven chamber by producing reflectable infra-red radiation and hot flue gases. The present invention employs vent means communicating with the oven chamber at a distance from the radiant burner so that the hot flue gases will heat walls of the oven chamber before escaping therefrom through the vent means. The radiant burner is preferably located in the sidewall at a level with respect to the food rack such that the sum of the reflected and radiated heat fluxes from the inner surfaces of the chamber to the lower side of the food rack is substantially equal to the sum of the reflected and radiated heat fluxes from the inner surfaces to the upper side of the food rack. There is also provided a radiation diffusion baffle located between the radiant burner and the food rack, the baffle having a plurality of openings therethrough for shielding the food rack from substantial direct radiation from the radiant burner so that a substantially even heat distribution is provided from one end of the food rack to the other by reflection of the radiation around the inner surface to the food rack. In the preferred form of the invention, the gas-fixed radiant burner is of the type for providing more than half of its reflectable infra-red radiation in the two to six micron wavelength region and the inner surface of the oven chamber is a matte reflecting surface to give more uniform redistribution and multiple reflection of radiation impinging thereon.

The use of one gas-fired radiant burner, as opposed to two, makes the gas-operated radiant oven of the present invention less expensive and more compact. The system of the present invention in using the hot flue gases to heat walls of the oven prior to escaping from the chamber provides more efficient use of useable heat in that the inner walls provide two sources of radiation, one, a reflector of incident radiation and, the other, a primary radiator due to its own temperature increased by the hot flue gases passing thereover. The arrangement of the present invention also enables a more equal heat flux distribution over the food rack than provided in the prior art through adjusting the radiant burner with respect to the level of the food racks so that the sum of reflected and radiated heat fluxes from the inner surfaces of the over chamber impinging upon the upper and lower sides of the food rack is made substantially equal.

For a better understanding of these and other features and advantages of the present invention, reference is made to the following detailed description and the accompanying drawings, in which:

FIG. 1 is a perspective view of the gas-fired radiant oven of the present invention;

FIG. 2 is a front elevation view, partially in section, showing one embodiment of the internal portions of the oven and particularly the cross-sectional form of one embodiment of the oven chamber;

FIG. 3 is a sectional view taken along the line 3—3 of FIG. 2; and

FIG. 4 is a cross-sectional view of the oven chamber similar to FIG. 2 illustrating some general lines of radiation from the radiant burner to the food rack.

Referring now to the embodiment of the invention illustrated in FIGS. 1 and 2, the gas-fired radiant oven of the present invention is provided with a generally rectangular shaped housing generally designated 10 having feet 11 of rubber secured to the bottom corners of the housing. The housing has supported therein an oven chamber 12, a gas-fired radiant burner 14 supported in a sidewall of the oven chamber and control apparatus for the gas system generally designated 16.

In the preferred embodiment of the radiant oven, the gas-fired radiant burner is a conventional atmospheric injection infra-red gas burner of the type manufactured by the Profection Division of Hupp Corporation of Cleveland, Ohio. This type of radiant burner acts as a solid radiator and provides two sources of useable heat, one of the form of reflectable infra-red radiation and the other one of the form of hot flue gases resulting from gas combustion in the burner. In addition, this type of gas-fired radiant burner provides approximately 70 percent of its reflectable infra-red radiation in the two to six micron wavelength region. It has long been known in the art that this region of infra-red radiation penetrates much deeper into food than longer or shorter wavelength radiation. This is significant since the heat absorption and penetration of this radiation distributes through a much larger mass of food being heated and can be introduced into the food without overheating of the surface thereof. In contrast, radiation which is absorbed mostly in a thin surface layer of food must be introduced slowly enough to permit the heat to be carried into the interior by conduction or the surface of the food will be burned.

As can be seen in FIGS. 1 and 3, a drawer generally designated 22 is provided in face 10a of the housing, hereinafter referred to as the front of the housing. The drawer is provided with a handle 24 for ease of opening and closing thereof, and permits access into the oven chamber 12. The drawer provides a wire food rack 26 as a bottom thereof which is slidable into the oven chamber within channels 28 and 30 on opposite sides of the food rack secured to walls of the oven chamber.

As can be seen in the front elevational view of FIG. 2 with parts broken away to show a sectional view of the oven chamber, the oven chamber is generally pear-shaped in cross-section being composed of a pair of opposed trough-like members one of which is trapezoidal in section and the other of which is semi-circular in section arranged with their open sides closed together along a vertical plane so that each trough-like member is symmetrical about a horizontal axis, having flat pear-shaped silhouette front wall 32 adjacent the front 10a of the housing and a similar flat pear-shaped silhouette back wall 34. Sidewall 36 has a semi-circular cross-section and the trapezoidal section may be broken down into flat portions 38, 40 and 42. A single rectangular sheet of aluminum may be bent and folded to produce all sidewalls top and bottom or they may be fabricated from separate sheets and secured together by appropriate means. Sidewall portion 38 is vertically oriented while portions 40 and 42 are arranged on substantially 30° angles with the horizontal. As suggested above, the oven chamber is symmetrical about a horizontal plane at mid-oven level. The flat front wall 32 and flat back wall 34 conform to the cross-sectional shape of the oven chamber and are made of sheets of aluminum.

As can be seen more clearly in FIG. 2, the oven chamber is supported in the housing within a radiation shield 46 which encloses the entire inner oven wall. The radiation shield 46 only makes contact with the oven chamber for support thereof along small areas of semi-circular sidewall 36 and portions 38 and 42. This minimum contact with the oven chamber is desirable so that substantial conduction of heat away from the surfaces of the oven walls is avoided. The oven chamber may be secured to the radiation shield by spot welding or the like. There is also provided insulation 48, such as rock wool, around the outside of the oven chamber against the surfaces to reduce conduction of heat away from the outside surfaces of the oven chamber, as shown most clearly in FIG. 2.

As previously mentioned, drawer 22 with food rack 26 extends into the oven chamber through a rectangular opening in front 10a of the housing aligned with a rectangular opening 32a in front wall 32 of the oven chamber. The food rack is supported in the oven at substantially mid-oven level by channels 28 and 30. The gas-fired radiant burner is located in an opening in semi-circular sidewall 36 and is supported by the radiation shield 46. A screen 50 the size of the radiant burner heat surface is supported by sidewall 36 adjacent the burner surface for containing the flame of the burner between the screen and the burner surface.

In order to prevent substantial direct radiation from the radiant burner impinging upon the side of any food on the food rack nearer the burner in an amount unequal to the radiation impinging thereon at the far side from the burner, a radiation diffusion baffle 52 is employed between the burner and the food rack. In the preferred embodiment the baffle 52 is supported by channel 30 and is made from a rectangular sheet of aluminum bent in a general channel form to have gradually upwardly and downwardly curved sides diverging from the channel above and below the food rack. More specifically, the radiation diffusion baffle is shown in the form of a cissoid supported at the cusp thereof with the flared sides extending outwardly away from the radiant burner above and below the food rack. As can be seen more clearly in FIG. 3, the baffle has a plurality of spaced perforations 54 therethrough in its upper and lower extending sides. The perforations allow a limited amount of direct radiation from the radiant burner through the baffle to pass in the areas above and below the food rack. The number of perforations to be employed depends on the heat input of the radiant burner and the amount of radiation from the inner surfaces of the chamber directed to impinge on the side of food on the food rack away from the face of the burner. The perforations allow a limited amount of direct radiation across the food rack from the direction of the burner, which is made substantially equal to the amount of reflected radiation passing over the food rack from the opposite direction.

As previously stated, the radiant burner produces two sources of heat, one in the form of reflectable infra-red radiation and the other in the form of hot flue gases. As to the reflectable radiation, the inner surface of the oven chamber may be of aluminum. In this instance, the radiation is reflected around the oven chamber to the food rack as shown in FIG. 4, illustrating some representative lines of reflected radiation to the baffle around the oven chamber and some lines passing through the perforations in the baffle to pass adjacent the top and bottom of the food rack. However, in the preferred form of the invention, it is desirable to have the reflectable radiation reflected from the inner surfaces of the chamber in as many directions as possible to avoid specular reflections. There is preferably employed a matte reflecting surface as the inner surface of the oven chamber to give a much more uniform and diffuse redistribution of incident radiation around the inner surface of the oven chamber to the food rack. The reflectable infra-red radiation is subject to multiple reflections around the inner surface of the oven chamber until completely absorbed. The lower the absorption coefficient of the inner surface the greater the proportion of the radiation will be absorbed by the food rack and food thereon.

As to the hot flue gases produced by the radiant burner, these rise in the oven chamber from the burner and heat the walls of the upper portion of the chamber. The direct thermal radiation from the inner surface walls of the chamber is a function of the fourth power of the absolute temperature of the walls. In other words, there are two sources of radiation from the inner surface walls of the oven chamber, one in the form of redistributed reflected radiation and the other as direct radiation from the walls due to their temperature. In light of this last-mentioned radiation, it is preferable to allow the hot flue gases to pass over a large portion of the upper inner surface of the oven chamber before being vented from the chamber. As can be seen in FIG. 2, vent means in the form of a rectangular vent pipe 56 communicates with the oven chamber adjacent the top thereof in back wall 34. The vent pipe is located at a distance from the radiant burner in order to allow the hot flue gases to wash the walls of the upper portion of the chamber before escaping therefrom. In one operation of the radiant burner in the above-described oven chamber, the walls of the upper portion of the chamber were at a temperature of 415° F. and the walls of the lower portion of the chamber were at a temperature of 255° F. This difference in temperature is caused for the most part by the hot flue gases passing over the walls of the upper portion of the chamber to raise the temperature thereof. In the above-mentioned instance of temperatures of the upper and lower portions, the direct thermal radiation from the upper portion to the food rack was approximately 1680 B.t.u. per hour and from the lower portion to the food rack was approximately 788 B.t.u. per hour. Thus, the direct thermal radiation from the walls of the upper portion of the chamber to the food rack is much greater than the direct thermal radiation of the walls of the lower portion of the chamber to the food rack.

In order to equalize the total radiation, direct thermal radiation and redistributed reflected radiation, to the upper and lower sides of the food rack, the level of the radiant burner in the sidewall of the oven chamber is adjusted with respect to the level of the food rack in the oven chamber to a height at which the sum of the reflected and directly radiated heat fluxes from the inner surfaces of the chamber to the upper side of the food rack is substantially equal to the sum of the reflected and directly radiated heat fluxes from the inner surfaces to the lower side of the food rack. Hence, in the oven arrangement in the present instance, more reflectable radiation from the radiant burner should be directed below the food rack to compensate for the increased amount of thermal radiation from the upper portion of the chamber due to its increased temperature. This compensation is provided by adjusting the level of the vertically oriented burner surface to have more of the burner surface below the level of the food rack.

In light of the heating produced by the oven walls due to their temperature, the heat losses from the walls to the exterior of the oven should be minimized as much as possible. It is for this reason that there is minimum contact with the oven chamber by the supporting radiation shield 46 thereby decreasing conduction of heat away from the walls. Also, having the exterior surfaces of the oven chamber of brightly finished aluminum would reduce radiation from the walls of the chamber to outside thereof.

It should be understood that the specific shape of the oven chamber shown and described in the present instance provides the most economical shaped oven chamber to manufacture and a shape capable of directing the reflectable radiation from the radiant burner substantially equally over all portions of the food rack. A more ideal form of the oven chamber would be a spherical shape, providing an inner spherical surface to the oven. Other varied shapes of the oven chamber, such as oval or a less desirable shape such as rectangular, may be used to produce a reasonably even heat flux over the food rack. It should also be appreciated that the shape and configuration of the radiation diffusion baffle may be varied as long as the baffle functions to shield the portion of the food rack nearer the burner surface from substantial direct radiation from the burner.

The radiant burner is operated and controlled by the control apparatus generally designated 16 located in the housing adjacent the oven chamber, as can be seen in FIG. 2. More specifically, as can be seen in FIG. 3, a gas supply line 60, which may be connected to a suitable supply of manufactured or natural gas, enters the housing 10 through a circular opening therein and is connected at its other end to a conventional combination valve generally designated 62 comprising a main automatic gas control valve, an automatic pilot valve and a gas pressure regulator. A manual adjustable hand valve 64 is provided in supply line 60 prior to its connection to combination valve 62 for connecting the supply line alternatively to the previously mentioned outside supply of gas or to a source of bottled gas 66, such as a bottle of propane gas, located in the housing and connected to the hand valve through suitable fitting 68 and supply line 70, as seen in FIG. 2 and 3. Through the use of the bottled gas supply located inside the housing, complete portability of the oven unit is provided as for outdoor camping or other uses where a more stationary gas supply is not readily available. There is connected from the combination valve 62 a first gas supply conduit 72 to radiant burner 14 and a second gas supply conduit 74 to a pilot burner 76 providing means for igniting the gas-fired radiant burner and supported beneath the burner by the radiation shield 46.

Adjacent the pilot burner 76 as shown in FIGS. 2 and 3, a pilot millivolt generator 78 is supported in the sidewall of the oven chamber adjacent the pilot burner for providing a source of millivolt energy to open the solenoid-operated gas control valve of the full-on, full-off type located in the gas line to the radiant burner in the combination valve 62. The millivolt generator 78 comprises a bimetal element 80 heated by the pilot burner flame thereby generating electric energy to the solenoid-operated gas control valve to open the valve to allow gas to flow to the radiant burner. In the present instance, the millivolt generator 78 is connected in a series of electrical circuits with the solenoid gas control valve and a mechanical timer 82, shown in FIG. 2, by electrical conductors 84 connected between the timer 82 and the combination valve 62 and by conductors 86 connected between the millivolt generator 78 and the combination valve 62. More specifically, the mechanical timer 82 is located in and supported by front 10a of the housing. The front 10a has an opening therein through which the rotatable shank of the timer protrudes and the shank has attached thereto a pointer adjustment knob 88 which may be rotated to selected time position indicated by dial 90 formed integrally with front 10a and having time positioned designations printed thereon. When the knob of the mechanical timer is positioned to operate the timer, current will flow in the series circuit between the millivolt generator and the solenoid to energize the solenoid to open the gas control valve, thereby permitting a flow of gas to the radiant burner. Hence, when the timer is set to operate for a predetermined time, the radiant burner will be supplied with gas during that time interval enabling heating of the oven chamber; but when the timer completes its operation, the contacts located therein are opened thereby opening the series circuit deenergizing the solenoid to shut off the gas supply to the radiant burner through the gas control valve. By this arrangement, the radiant burner will only be supplied with gas from the control valve when the mechanical timer is positioned for a timing operation.

A sidewall 10b of the housing 10 has a door 94 therein to permit access into the housing to the control apparatus 16 of the gas system. The door has a hinge generally designated 96 adjacent the bottom of the housing and a rotatable handle 98 and associated latch mechanism generally designated 100 adjacent the top of the housing. The door 94 is provided with louvers 102 for allowing air to enter the housing and circulate to the atmospheric injection gas-fired radiant burner.

It will be observed that the gas-operated radiant oven of the present invention using a single gas-fired radiant burner and diffusion baffle provides advantages over the prior art systems in that a simpler and more inexpensive structure is provided. Moreover, the adjustment of the position of the radiant burner in the oven sidewall with respect to the level of the food rack in the oven chamber enables equalization of the heat fluxes impinging on the food rack in that the sum of the reflected and thermal radiated heat fluxes from the inner surfaces of the oven chamber to the upper surface of the food rack is made substantially equal to the sum of the reflected and thermal radiated heat fluxes from the inner surfaces to the lower side of the food rack. It will be appreciated by those skilled in the art that the arrangement of the present invention employs effective use of the hot flue gases in heating the oven chamber for more efficient use of the radiant burner.

While the invention has been described with particular reference to a specific embodiment thereof in the interest of complete disclosure, it should be understood that the invention may be embodied in a large variety of forms diverse from the one specifically shown and described, without departing from the scope and spirit of the invention as defined by the appended claims.

I claim:

1. A method of equalizing heat flux on a food rack generally located at mid-oven level of an oven chamber heated by a gas-fired radiant burner producing reflectable infra-red radiation and hot flue gases, the oven chamber having an inner surface capable of reflecting radiation, said method comprising the steps of: regulating the heat input of the burner to a predetermined value, and adjusting the level of the radiant burner with respect to the level of the food rack so that the sum of the reflected and radiated heat fluxes from the inner surfaces of the oven chamber to the lower side of the food rack is substantially equal to the sum of the reflected and radiated heat fluxes from the inner surfaces of the oven chamber to the upper side of the food rack.

2. A method of equalizing heat flux on the horizontally oriented food rack generally located at mid-oven level of an oven chamber, the oven chamber being heated by a gas-fired radiant burner located in a sidewall of the chamber and having an inner surface capable of reflecting radiation, the gas-fired radiant burner producing reflectable infra-red radiation and hot flue gases, said method comprising the steps of: regulating the heat input of the burner to a predetermined value, venting the hot flue gases from the oven chamber at a distance from the radiant burner so that heating of walls of the oven chamber is produced by the hot flue gases, and adjusting the level of the radiant burner in the sidewall with respect to the level of the food rack in the chamber so that the sum of the reflected and radiated heat fluxes from the inner surfaces to the lower side of the food rack is substantially equal to the sum of the reflected and radiated heat fluxes from the inner surfaces to the upper side of the food rack.

3. A method of equalizing heat flux on the horizontally oriented food rack generally located at mid-oven level of an oven chamber, the oven chamber being heated by a gas-fired radiant burner located in a sidewall of the chamber and having an inner surface capable of reflecting radiation, the gas-fired radiant burner producing reflectable infra-red radiation and hot flue gases, said method comprising the steps of: regulating the heat input of the burner to a predetermined value, venting the hot flue gases from the oven chamber at a distance from the radiant burner so that heating of walls of the oven chamber is produced by the hot gases, shielding the food rack from substantial direct radiation from the radiant burner, and adjusting the level of the radiant burner in the sidewall with respect to the level of the food rack in the chamber so that the sum of the reflected and radiated heat fluxes from the inner surfaces to the lower side of the food rack is substantially equal to the sum of the reflected and radiated heat fluxes from the inner surfaces to the upper side of the food rack.

4. A method of equalizing heat flux on a horizontally oriented food rack generally located at mid-oven level of an oven chamber, the oven chamber being heated by a gas-fired radiant burner located in a sidewall of the chamber and having an inner surface capable of reflecting radiation, the gas-fired radiant burner producing reflectable infra-red radiation and hot flue gases, said method comprising the steps of: regulating the heat input of the burner to a predetermined value, venting the hot flue gases from the oven chamber at a distance from the radiant burner so that heating of walls of the oven chamber is produced by the hot flue gases, shielding the food rack from substantial direct radiation from the radiant burner, and adjusting the average level of the radiant burner in the sidewall far enough below the level of the food rack so that the sum of the reflected and radiated heat fluxes from the inner surfaces to the lower side of the food rack is substantially equal to the sum of the reflected and radiated heat fluxes from the inner surfaces to the upper side of the food rack.

5. A gas-fired radiant oven comprising: an oven chamber having an inner surface capable of reflecting radiation, a food rack supported in said oven chamber at substantially mid-oven level, a gas-fired radiant burner adjusted to a predetermined heat input and located in a sidewall of said oven chamber, said radiant burner heating said chamber by producing reflectable infra-red radiation and by producing hot flue gases, and vent means communicating with said oven chamber at a distance from said radiant burner so that said hot flue gases will heat walls of said oven chamber before escaping therefrom through said vent means, said radiant burner being located in said sidewall at a level with respect to said food rack such that the sum of the reflected and radiated heat fluxes from the inner surfaces to the lower side of the food rack is substantially equal to the sum of the reflected and radiated heat fluxes from the inner surfaces to the upper side of the food rack.

6. A gas-fired radiant oven comprising: an oven chamber having an inner surface capable of reflecting radiation, a food rack supported in said oven chamber at substantially mid-oven level, a gas-fired radiant burner adjusted to a predetermined heat input and located in a sidewall of said oven chamber, said radiant burner heating said chamber by producing reflectable infra-red radiation and by producing hot flue gases, vent means communicating with said oven chamber at a distance from said radiant burner so that said hot flue gases will heat walls of said oven chamber before escaping therefrom through said vent means, and a radiation diffusion baffle located between said radiant burner and said food rack to shield said food rack from substantial direct radiation from said radiant burner, said radiant burner being located in said sidewall at a level with respect to said food rack such that the sum of the reflected and radiated heat fluxes from the inner surfaces to the lower side of the food rack is substantially equal to the sum of the reflected and radiated heat fluxes from the inner surfaces to the upper side of the food rack.

7. A gas-fired radiant oven comprising: an oven chamber having an inner surface capable of reflecting radiation, said oven chamber being generally pear-shaped in form in cross-section with flat front and back walls, a food rack supported in said oven chamber at substantially mid-oven level, a gas-fired radiant burner adjusted to a predetermined heat input and located in a curved sidewall of said oven chamber, said radiant burner heating said chamber by producing reflectable infra-red radiation and by producing hot flue gases, vent means communicating with said oven chamber at a distance from said radiant burner so that said hot flue gases will heat walls of said oven chamber before escaping therefrom through said vent means, and said radiant burner being located in said sidewall at a level with respect to said food rack such that the sum of the reflected and radiated heat fluxes from the inner surfaces to the lower side of the food rack is substantially equal to the sum of the reflected and radiated heat fluxes from the inner surfaces to the upper side of the food rack.

8. A gas-fired radiant oven comprising: an oven chamber having an inner surface capable of reflecting radiation, said oven chamber having opposed trough-like members in cross-section arranged with their open sides closed together along a vertical plane so that each trough-like member is symmetrical about a horizontal axis, said oven chamber having flat front and back walls, a food rack supported in said oven chamber at substantially mid-oven level, a gas-fired radiant burner adjusted to a predetermined heat input and located in a sidewall of said oven chamber, vent means communicating with said oven chamber at a distance from said radiant burner so that said hot flue gases will heat walls of said oven chamber before escaping therefrom through said vent means, a radiation diffusion baffle located between said radiant burner and said food rack to shield said food rack from substantial direct radiation from said radiant burner, and said radiant burner being located in said sidewall at a level with respect to said food rack such that the sum of the reflected and radiated heat fluxes from the inner surfaces to the lower side of the food rack is substantially equal to the sum of the reflected and radiated heat fluxes from the inner surfaces to the upper side of the food rack.

9. A gas-fired radiant oven comprising: an oven chamber having an inner surface capable of reflecting radiation, said oven chamber having a pair of opposed trough-like members one of which is trapezoidal in cross-section and the other of which is semi-circular in cross-section arranged with their open sides closed together along a vertical plane so that each trough-like member is symmetrical about a horizontal axis, said oven chamber having flat front and back walls, a food rack supported in said oven chamber at substantially mid-oven level, a gas-fired radiant burner adjusted to a predetermined heat input and located in said semi-circular sidewall of said oven chamber, vent means communicating with said oven chamber at a distance from said radiant burner so that said hot flue gases will heat walls of said oven chamber before escaping therefrom through said vent means, a radiation diffusion baffle located between said radiant burner and said food rack and comprising a curved sheet of refractory material having a plurality of openings therethrough, said baffle being channel shaped in section and extending above and below said food rack, said baffle shielding areas above and below said food rack from substantial direct radiation from said radiant burner, and said radiant burner being located in said sidewall at a level with respect to said food rack such that the sum of the reflected and radiated heat fluxes from the inner surfaces to the lower side of the food rack is substantially equal to the sum of the reflected and radiated heat fluxes from the inner surfaces to the upper side of the food rack.

10. A gas-fired radiant oven comprising: an oven chamber having an inner surface capable of reflecting radiation, said oven chamber having a pair of opposed trough-like members one of which is trapezoidal in cross-section and the other of which is semi-circular in cross-section arranged with their open sides closed together along a vertical plane so that each trough-like member is symmetrical about a horizontal axis, said oven chamber having flat front and back walls, a food rack supported in said oven chamber at substantially mid-oven level, a gas-fired radiant burner adjusted to a predetermined heat input and located in said semi-circular sidewall of said oven chamber, vent means communicating with said oven chamber at a distance from said radiant burner so that said hot flue gases will heat walls of said oven chamber before escaping therefrom through said vent means, a radiation diffusion baffle located between said radiant burner and said food rack and comprising a sheet of refractory material generally in the form of a cissoid supported at the cusp thereof, said baffle being supported along the line of said food rack and having outwardly extending ends above and below said food rack, said baffle having a plurality of openings therethrough, said baffle shielding areas above and below said food rack from substantial direct radiation from said radiant burner, said radiant burner being located in said sidewall at a level with respect to said food rack such that the sum of the reflected and radiated heat fluxes from the inner surfaces to the lower side of the food rack is substantially equal to the sum of the reflected and radiated heat fluxes from the inner surfaces to the upper side of the food rack.

11. The gas-fired radiant oven of claim 5 in which said gas-fired radiant burner is of a type for providing more than half its reflectable infra-red radiation in the two to six micron wavelength region.

12. The gas-fired radiant oven of claim 5 in which said inner surface of said oven chamber which is capable of reflecting radiation comprises a matte reflecting surface.

References Cited

UNITED STATES PATENTS

| | | | |
|---|---|---|---|
| 1,587,023 | 6/1926 | Mottlau | 126—41 X |
| 2,314,249 | 3/1943 | Sherman | 126—274 X |
| 2,476,067 | 7/1949 | Sherman | 126—41 |
| 3,114,363 | 12/1963 | Koltun | 126—41 |
| 3,152,243 | 10/1964 | Andrews | 219—405 |
| 3,193,663 | 7/1965 | Budzich et al. | 219—405 |

FREDERICK L. MATTESON, JR., *Primary Examiner.*

E. G. FAVORS, *Assistant Examiner.*